United States Patent [19]

Sutch

[11] Patent Number: 4,560,082

[45] Date of Patent: Dec. 24, 1985

[54] LID AND CONTAINER HAVING TAMPERPROOF MEANS

[76] Inventor: Brian L. C. Sutch, Chudleigh House, The Island, Thames Ditton, Surrey, England

[21] Appl. No.: 631,794

[22] Filed: Jul. 17, 1984

[30] Foreign Application Priority Data

Jul. 22, 1983 [GB] United Kingdom ............... 8319856
Nov. 28, 1983 [GB] United Kingdom ............... 8331725

[51] Int. Cl.[4] ............................................. B65D 41/32
[52] U.S. Cl. .................................... 220/270; 220/306
[58] Field of Search ..................... 220/214, 270, 260; 215/256; 229/43

[56] References Cited

U.S. PATENT DOCUMENTS

| | | | |
|---|---|---|---|
| 4,252,248 | 2/1981 | Obrist et al. | 220/270 |
| 4,360,121 | 11/1982 | Helms | 220/270 |
| 4,390,110 | 6/1983 | Pirro | 220/306 |
| 4,476,993 | 10/1984 | Krout | 220/306 |

Primary Examiner—George T. Hall
Attorney, Agent, or Firm—Scrivener Clarke Scrivener and Johnson

[57] ABSTRACT

A lid for a pilfer evident container has an inverted U-section rim in which nests an inverted U-section lip of a container, the lid rim having at least one opening in the outer limb, the outer limb of the container lip and lid rim being continuous around the lid, with the former having an outwardly projecting portion which is received by the lid opening to prevent removal of the lid after application to the container, the lid being removable by rupturing the connection between that part of the lid outer limb in the path of which, in the direction of lid removal, lies the outwardly projecting portion of the container rim.

4 Claims, 8 Drawing Figures

LID AND CONTAINER HAVING TAMPERPROOF MEANS

This invention is concerned with improvements in and relating to lids and containers and more particularly lid and container combinations having a pilfer evident characteristic.

A particularly useful type of lid comprises a main panel which has an inverted U-section rim, the lower end of the inner limb of which is connected to the main panel. To apply such a lid to the lip of the container, the inverted U-section rim is applied to the lip which in turn is preferably of inverted U-section and nests in the rim of the lid. An inwardly directed rib on the outer limb of the lid rim is provided which will engage under the outer limb of the lip of the container to hold the lid on the container.

The lid may be vacuum formed, it may be an injection moulding or it may have a main panel being a blank of card or foil-like material with an injection moulded or rim formed on and bonded to the blank. Likewise the container may be vacuum formed, injection moulded of card or foil like material seamed to injection moulding with an injection moulded lip.

Such lids can be readily removed from the container and replaced without leaving any evidence that this has occurred. To assist a purchaser of product packed in such a lid and container it is desirable to secure the lid and container together in such a fashion that first removal of the lid requires that the lid and/or container be deformed or disfigured so that the purchaser can see if access has been had to the container prior to purchase.

It has been proposed to make a rectangular lid which will be applicable to a rectangular container having an injection moulded inverted U-section lip and which has a pilfer evident feature. In that proposal the lid is an injection moulding having an inverted U-section rim which at the corners has on the outer limb of the U-section a pronounced inward projection for snap engagement under the outer limb but sufficiently pronounced that the movement is irreversible. That inward projection is integral with a pull tab which projects downwardly from the outer limb of the inverted U-section rim of the lid, the projection and tab being coupled to that outer limb by connection pieces at either end of a slot so that the projection and tab can be broken away, by means of the tab from the lid outer limb by breaking the connection pieces. The slot reduces the length of the connection which has to be broken to remove the projection but the connection pieces have to be sufficiently strong that the projection can be sprung off the moulding tool on which the lid is moulded. To make the slot at each corner moving blades are required movable between a moulding position to define the slot and an ejection position to lie out of the path of the moulded lid when being ejected following opening of the mould. Thus in a four impression tool to make four rectangular lids, there would be sixteen blades all requiring drive means synchronized with mould opening, closing and injection stages. Such blades and their drives add cost, they are relatively weak, tend to break and are subject to considerable wear.

A similar situation, to provide a pilfer evident characteristic on a lid/container combination where the lid projects inwards to engage under the container rim could be adopted and obviate the use of blades but this requires any slot to be produced by a shut-off, that is to say two mould tool faces which, when the tool closes, abut and deny access to injected material of which the result is a hole or slot. In the case of an inverted U-section lid rim and an inward projection on the outer limb, such a shut-off can be achieved only by a meeting of tool faces in that plane parallel with and between the limbs to which the projection extends inwardly. That plane will intersect the lip transverse wall of the U-section which interconnects the limbs and will result in the lid rim section normal to that plane being an inverted "L" section, being the lid rim inner limb and a part of the transverse wall. So at each corner there is no longer nesting of the container lip in an inverted U-section lid rim. The result of that can be loss of sealing at the corners because the container rim is displaceable away from the lid rim inner limb.

According to the present invention there is provided a lid having an inverted U-section rim in which nests an inverted U-section lip of a container, the lid rim having at least one opening in the outer limb, characterised in that the outer limb of the container lip and lid rim are continuous around the lid, the outer limb of the container lip has an outwardly projecting portion which is received by the lid opening to prevent removal of the lid after application to the container and includes means to rupture the connection between that part of the lid outer limb in the path of which, in the direction of lid removal, lies the outwardly projecting portion of the container rim to thereby permit removal of the lid from the container.

In the case of a polygonal lid there is preferably an opening in the lid at each corner.

The outwardly projecting portion of the container lip may be provided by an extension of the outer limb of that lip at the corner projecting further from the container than the remainder of the outer limb between the extensions thereby increasing the overall dimensions of the container at each corner by the extent of the extension. Alternatively the cross section of the lid rim and container rim may be reduced at each corner, the projection of the outer limb of the container extending outwardly at each corner as far as the container rim extends outwards at regions between the corners so that the overall dimension of the container at the corners is not increased.

By virtue of the absence of inward projections on the outer limb of the lid at the corners, the openings at the corners can be produced without moving parts in the mould tool or interrupting the continuity of nesting of the container lip in the lid rim and hence maintains good sealing between the lid and the container all round the lid.

In order that the invention may be well understood there will now be described some embodiments thereof, given by way of example only, reference being made to the accompanying drawings in which.

Figure 3:
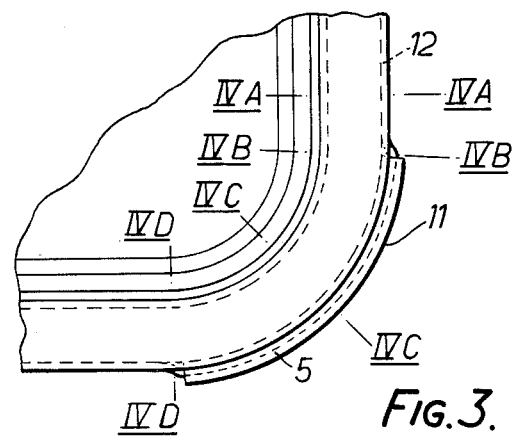
FIG. 3 is a plan view of a corner of a modified lid.
Figure 4:
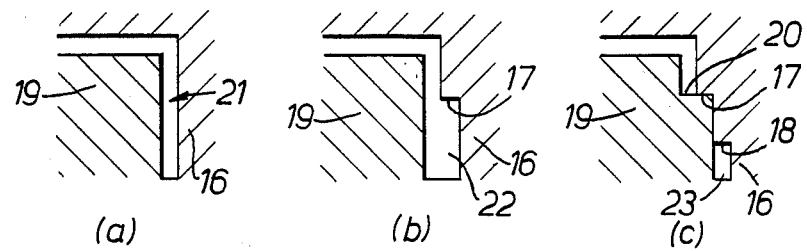
Figure 4:
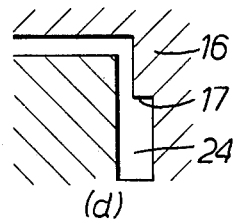
Figure 5:
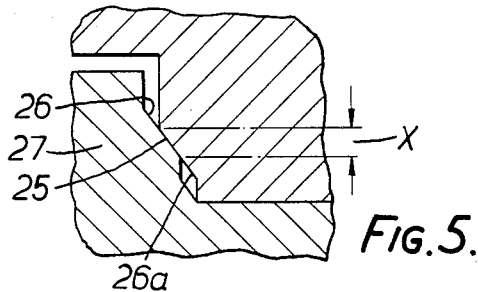
Figure 6:
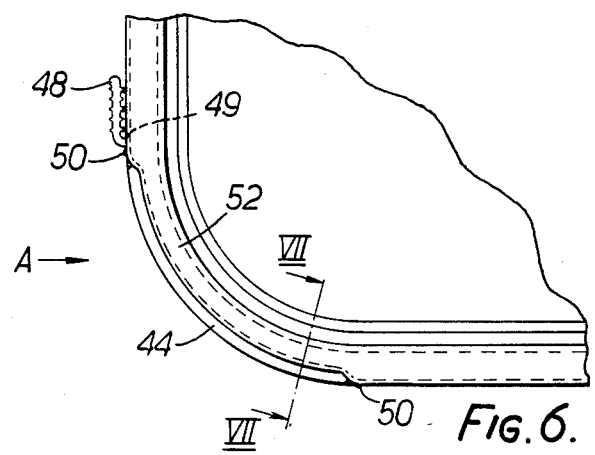
Figure 7:
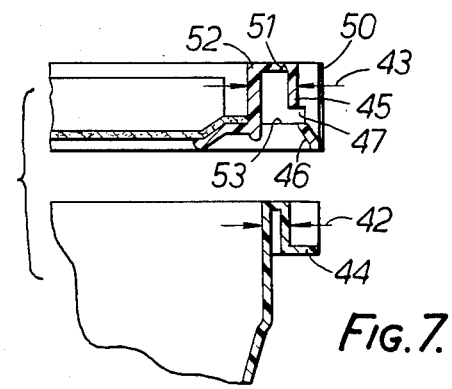
Figure 8:
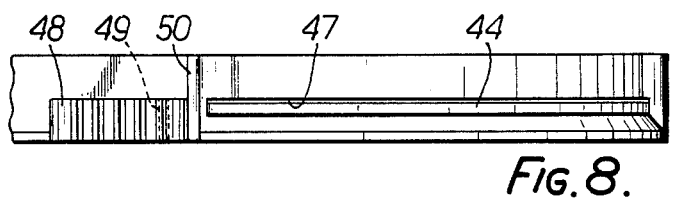

FIG. 4a–d are sections along lines corresponding to lines IVA–D of FIG. 3 but through a pair of mould tools, FIG. 5 is a section through a pair of mould tools for forming another embodiment of lid corner, FIG. 6 is a plan view of another embodiment of a corner of a lid and container according to this invention, FIG. 7 is an exploded view of a section of the lid and container along the line VII—VII of FIG. 6, and FIG. 8 is an elevation of the corner shown in FIG. 3 in the direction indicated by arrow A.

A container 1, here a thremoformed container having a generally rectangular horizontal section has a wall 2 terminating at the mouth of the container in an inverted U-section lip 3. At each corner the container wall is radiused and the outer limb 4 of the lip 3 is deformed outwardly at 5. This can be achieved by a simple modification of a form on which such a container is at present made, the modification being the alteration of the surface over which the thermoforming is effected to achieve the decrease in outward inclination of the limb at the corners and shearing the material on a slightly larger radius at the corner.

The lid is here a composite lid that is to say a lid made by placing a label 6 of card, board, foil or any other suitable material between a pair of mould tools which will define a mould cavity shaped to form an inverted U-section rim 7 around and bonded to the label which preferably has side panels 8 which extend up the inner faces 9 of the inner limbs 10 of the rim 7. The rim 7 has a continuous U-section all around the lid so that everywhere the container lip nests in the lid rim.

Figure 2:
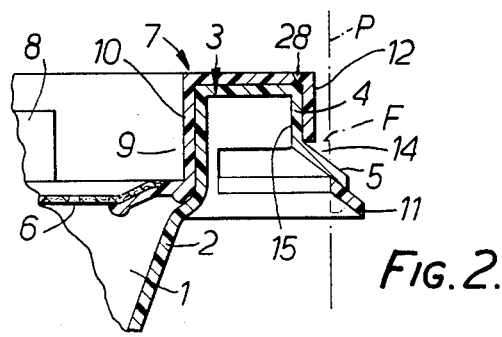
FIG. 2 is a section on the line II—II of FIG. 1.

The mould tools are formed to provide a lip 11 at the free edge of the outer limb 12 of rim 7 and at each corner the cavity tool, the tool which will define the upper surface of the lid, and the core tool, the tool which will define the under side of the lid, have shut-off surfaces, which will deny the mould cavity to the injected material to form an aperture or slit 14 at each corner which will receive a deformed part 5 of container limb 4. In FIG. 2, the core tool face on that face which will define the inside of the lid rim will extend inwardly and upwardly from what will be the outermost edge 11 of the lid outer limb 12 until it reaches a plane indicated at P outside the plane of the outer face of part 15 of limb 12. The core tool will then extend in that plane P up to what will be the level of the upper edge of slit 14. It will then turn inwardly to define an end abutment face (indicated at F) to engage the cavity tool and that edge of the slit whereafter it will turn upwardly thereafter to define the internal surface of rim 7. The cavity tool on the other hand extends from edge 11 up to outerface of outer limb 12 until it reaches the top of the incline where it will meet the circumferential face of the core tool and thence after reaching the end abutment face F of the core tool in the plane of the top edge of slit 14 it will define the remainder of the outer surface of the rim 4.

By this arrangement the mould tools have solid machined faces with no moving parts, slits 14 are formed to receive the deformed parts 5 of the container outer limb 4 and a lead is provided on the extremity of limb 12 of the rim 7 when applying the lid to the container.

The lid and container could each be made by other procedures. The lid and/or container could be an injection moulding in which case the procedure for making the lid would be similar while the container lip could be produced by very simply shaping the mould cavity to provide a suitably projecting lip at each corner. The container could be a composite of label and injection moulding in which case the rim would be injection mould. Other materials and procedures could be adopted also. For example the lid could be thermoformed and projections being used to produce the slits 14.

It could be arranged to form that part of the outer limb of the lid below the slit aperture 14 in a plane parallel with but offset outwrdly from that part of the outer limb which is above slit 14.

FIGS. 3 and 4 show this arrangement.

Cavity tool 16 is now formed at each corner with steps 17 and 18 and core tool 19 within the arc about which the steps extend in the cavity tool has a step 20 which will, in the closed condition of the tools, abut the step 17 to form a shut-off, injected material being free to flow from the basic cavity 21 forming lid outer limb 12 into the cavity 22 and thence along cavity 23 which will form the lower part 11 of the outer limb and thence through cavity 24 corresponding with cavity 22 and on to the next cavity 21 to form the next outer limb 12.

Whilst the invention has been described in relation to the corner of a rectangular lid, the same technique could be applied to a round lid and container. Thus for example a number of spaced projections similar to part 5 of FIG. 1 could be formed on a round container and a corresponding number of apertures in a lid outer limb. Referring now to FIG. 5 a pair of mould tools are shown where a shut-off 25 is formed by a pair of inclined faces, one, 26 being on a shoulder of cavity tool 27 at a corner extending over an arc sufficiently large to form a slit which will accommodate the part 5 of the lid while the other 26a is the face which defines the upper surface of the inclined part of limb 12. The slit 14 must have a depth X sufficient to allow the part 5 to snap into engagement with it as the lid is applied to the container.

Figure 1:
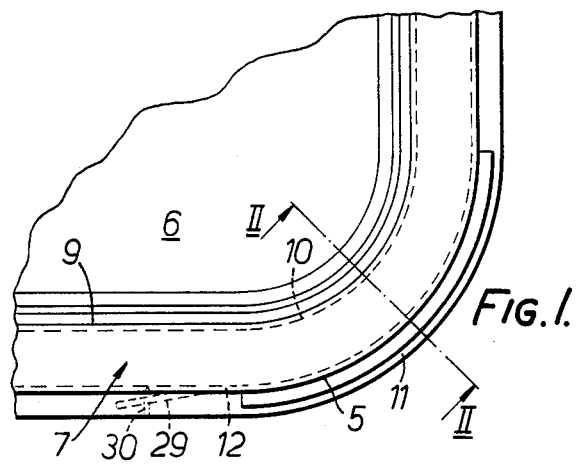
FIG. 1 is a plan view of a corner of a rectangular lid applied to a container.

To release a lid according to any of the embodiments described, there may be provided any suitable arrangement such for example as providing a line of weakening diagrammatically indicated at 28 in FIG. 2 and a pull tab 29 with a vertical line of weakening diagrammatically shown at 30 in FIG. 1.

The lid and container shown in FIG. 6 comprise lid L having a main panel 31 and a rim 32 of inverted U-section while the container has a lip 33 also of inverted U-section and dimensioned to nest in rim 32 of the lid. The lid rim has a bead 53 (FIG. 7) on the inner surface of outer limb 36 which engages under the free edge 37 of outer limb 38 of container lip 33 to hold the lid in position between corners.

The lid is here again made as a card blank 9 with side panels 10, the rim being an injection moulding. Such a lid is described in detail in U.K. Pat. No. 1450529.

At each of a number of spaced regions, here the corners of the container and lid, the container lip is modified to be of reduced transverse cross section, as indicated at 42 as also is the rim of the lid as shown at 43, so that the container lip still nests in the lid rim all around the lid. The container lip is provided with an outwardly projecting flange 44 at its free edge which extends outwardly through the outer limb 45 of the lid rim at the said region.

The lid rim at this region has a retainer piece 46 which extends between outer limbs 36 of the lid rim to either side of the said region, lies beneath the flange 44 and lies outwardly of the outer limb 45 of the lid rim. This allows the lid rim to be moulded between a pair of mould tools which have shut-off faces which meet to define what will be aperture 47 in the finished rim.

The lid cannot be removed from the container until the retainer piece 46 has been removed which is effected by means of tab 48 connected to the outer limb 36 between a line of weakening 49 and the aperture. A strengthening bead 50 may be provided at each end of the aperture and a line of weakening 51 in top wall 52 of the lid rim in the region of reduced transverse dimension. Pull on the tab will detach the bead 50 and take away the outer limb 45 and the retainer piece and thus allow the lid to be removed but the removal of the retainer piece will indicate that access has been had to the container since the lid was first applied. The line of weakening 51 may be confined to the corners but may be continuous so that a single tab will serve to release the lid at each corner.

Presently however it is preferred merely to arrange for the tab 48 to remove piece 46.

A polygonal lid and container have been shown but the regions of reduced external transverse dimensions of the lid rim and container lip can be spaced along straight edges or continuously curved edges.

By provision in both embodiments of a continuous nesting of the rim and lip and the engagement of the retainer piece under the flange a firm secure fit is provided which will be sealing tight holding the container against lateral displacement away from the inner limb of the lid rim which would be the case if the slit were to extend up the lid outer limb and over a part of the lateral wall of the container lip. Furthermore there are no moving parts in the mould tools. By providing for removal only of the piece 46 to release the lid, a nesting engagement is available if the lid is reused.

I claim:

1. A lid having an inverted U-section rim in which nests an inverted U-section lip of a container, the lid rim having at least one opening in the outer limb, characterised in that the outer limb of the container lip and lid rim are continuous around the lid, the outer limb of the container lip has an outwardly projecting portion which is received by the lid opening to prevent removal of the lid after application to the container and includes means to rupture the connection between the part of the lid outer limb in the path of which, in the direction of lid removal, lies the outwardly projecting portion of the container rim to thereby permit removal of the lid from the container.

2. A lid and container according to claim 1 characterised in that the opening in the outer limb of the lid rim lies outside the plane of that part of that outer limb in which the container rim nests and within the plane of that part of the outer limb of the lid rim in the path of which the outwardly projecting portion of the container lip lies.

3. According to claim 2 in which the outwardly projecting portion of the container lip extends outwardly from the container further than does the outer limb of the container lip outer limb to either side of that portion.

4. According to claim 1 in which lid rim opening is provided in a part of the container where the container lip and the lid rim are of reduced cross section, that outwardly projecting portion of the container lip extending from the container as far as the outer limb of the container lip extends to either side of said part of reduced transverse cross section.

* * * * *